United States Patent
Ide et al.

(10) Patent No.: US 10,406,622 B2
(45) Date of Patent: Sep. 10, 2019

(54) ARC-WELDING POWER SUPPLY

(71) Applicant: DAIHEN CORPORATION, Osaka (JP)

(72) Inventors: Akihiro Ide, Osaka (JP); Toshiyuki Tanaka, Osaka (JP)

(73) Assignee: DAIHEN CORPORATION, Osaka (JP)

( * ) Notice: Subject to any disclaimer, the term of this patent is extended or adjusted under 35 U.S.C. 154(b) by 188 days.

(21) Appl. No.: 15/113,502

(22) PCT Filed: Feb. 9, 2015

(86) PCT No.: PCT/JP2015/053496
§ 371 (c)(1),
(2) Date: Jul. 22, 2016

(87) PCT Pub. No.: WO2015/125643
PCT Pub. Date: Aug. 27, 2015

(65) Prior Publication Data
US 2017/0008115 A1 Jan. 12, 2017

(30) Foreign Application Priority Data
Feb. 18, 2014 (JP) .................. 2014-028675

(51) Int. Cl.
*B23K 9/00* (2006.01)
*B23K 9/10* (2006.01)
(Continued)

(52) U.S. Cl.
CPC ............ *B23K 9/0956* (2013.01); *B23K 9/073* (2013.01); *B23K 9/092* (2013.01); *B23K 9/1056* (2013.01); *B23K 9/12* (2013.01)

(58) Field of Classification Search
CPC ...... B23K 9/073; B23K 9/092; B23K 9/0956; B23K 9/1056; B23K 9/12
(Continued)

(56) References Cited

U.S. PATENT DOCUMENTS

| 4,546,234 A | * | 10/1985 | Ogasawara | ............ | B23K 9/125 |
| | | | | | 219/130.21 |
| 6,531,684 B2 | * | 3/2003 | Rice | ........................ | B23K 9/073 |
| | | | | | 219/130.21 |

(Continued)

FOREIGN PATENT DOCUMENTS

| CN | 102271853 A | 12/2011 |
| JP | H01-157771 | 6/1989 |

(Continued)

OTHER PUBLICATIONS

English translation of JP 01-157771, Jun. 1989.*

(Continued)

*Primary Examiner* — Sang Y Paik
(74) *Attorney, Agent, or Firm* — Greenblum & Bernstein, P.L.C.

(57) ABSTRACT

There is provided an arc welding power supply. An output control unit outputs welding voltage and current in correspondence to each of a short-circuiting period and an arc period. A feeding control unit controls a feeding rate of a welding wire. A short-circuit forcibly generating period is provided between forward feeding acceleration and deceleration periods. In the short-circuit forcibly generating period, the feeding control unit increases the feeding rate with a change rate larger than a change rate during the forward feeding acceleration period and maintains a predetermined forward feeding peak value when the feeding rate reaches the peak value.

8 Claims, 8 Drawing Sheets

(51) Int. Cl.
  *B23K 9/095* (2006.01)
  *B23K 9/073* (2006.01)
  *B23K 9/09* (2006.01)
  *B23K 9/12* (2006.01)

(58) Field of Classification Search
  USPC ............. 219/124.1–124.32, 125.1–125.12, 219/130.1–130.33, 136–137.9
  See application file for complete search history.

(56) References Cited

U.S. PATENT DOCUMENTS

| | | | | |
|---|---|---|---|---|
| 7,705,270 | B2 * | 4/2010 | Norrish | B23K 9/09 219/130.21 |
| 2006/0016792 | A1 | 1/2006 | Uecker et al. | |
| 2008/0314884 | A1 | 12/2008 | Fujiwara et al. | |
| 2012/0097656 | A1 * | 4/2012 | Peters | B23K 9/091 219/130.51 |
| 2012/0145691 | A1 * | 6/2012 | Fujiwara | B23K 9/073 219/130.31 |
| 2013/0068744 | A1 | 3/2013 | Matsui et al. | |
| 2013/0082041 | A1 | 4/2013 | Kawamoto et al. | |

FOREIGN PATENT DOCUMENTS

| | | |
|---|---|---|
| JP | 4807474 | 8/2011 |
| JP | 2012-6020 | 1/2012 |
| WO | 2012/164833 | 12/2012 |

OTHER PUBLICATIONS

Search Report issued for PCT/JP2015/053496, dated May 12, 2015.

Extended European Search Report issued in European Application No. 15752546.0 dated Oct. 9, 2017.

Apr. 26, 2018 Chinese Office Action in corresponding Chinese Application No. 201580002825.X and Partial Translation.

* cited by examiner

ARC-WELDING POWER SUPPLY

TECHNICAL FIELD

The present invention relates to an arc welding power supply for performing welding by alternating feeding of a welding wire between forward feeding and reverse feeding cyclically.

BACKGROUND ART

In a typical consumable electrode arc welding, welding is performed by feeding a welding wire as a consumable electrode at a constant feeding rate and generating an arc between the welding wire and base material. In the consumable electrode arc welding, both the welding wire and the base material are mostly placed in a welding state in which a short circuit state and an arc generation state are alternately repeated. In a small current region where an average welding current value is less than about 180 A (a feeding rate is 4 m/min), short circuit and arc is repeated with an almost constant cycle. Thus in the small current region, the welding can be performed with a small generation amount of spatter and good bead appearance by suitably controlling the welding current and a welding voltage.

in contrast, in a large current region where the average welding current value is about 180 A or more, the cycle of short circuit and arc is longer than a suitable value and a variance of the cycle is large. Thus in the large current region, the generation amount of spatter tends to increase and the bead appearance tends to degrade even if the welding current and the welding voltage are controlled accurately. In order to improve this, there has been proposed a welding method of alternating feeding of the welding wire between forward feeding and reverse feeding cyclically (see a patent document 1, for example). Hereinafter this welding method will be explained.

FIG. 8 is a waveform diagram of the welding method in which the forward feeding and the reverse feeding of the feeding rate is repeated cyclically. (A) of this figure shows a waveform of a feeding rate Fw, (B) of this figure shows a waveform of a welding current Iw and (C) of this figure shows a waveform of a welding voltage Vw. Hereinafter explanation will be made with reference to this figure.

As shown in (A) of this figure, in the feeding rate Fw, an upper side and a lower side than 0 represent a forward feeding period and a reverse feeding period, respectively. The forward feeding represents feeding of the welding wire in a direction approaching the base material, whilst the reverse feeding represents feeding of the welding wire in a direction separating from the base material. The feeding rate Fw has a waveform which changes sinusoid ally and shifts on the forward feeding side. Thus as an average value of the feeding rate Fw is positive, the welding wire is fed forwardly in average.

As shown in (A) of this figure, the feeding Fw is 0 at a time t1, in a forward feeding acceleration period during a period from the time t1 to a time t2, the maximum value of the forward feeding at the time t2, in a forward feeding deceleration period during a period from the time t2 to a time t3, 0 at the time t3, in a reverse feeding acceleration period during a period from the time t3 to a time t4, the maximum value of the reverse feeding at the time t4, and in a reverse feeding deceleration period during a period from the time t4 to a time t5.

Short circuit between the welding wire and the base material occurs mostly before or after the maximum value of the forward feeding at the time t2. This figure shows a case where the short circuit occurs at a time t21 during the forward feeding deceleration period after the maximum value of the forward feeding. If the short circuit occurs at the time t21, the welding voltage Vw rapidly reduces to a short-circuit voltage value of a few volts as shown in (C) of this figure, and the welding current Iw also reduces to an initial current value of a small current value as shown in (B) of this figure. Thereafter the welding current Iw increases with a predetermined inclination. When the welding current reaches a predetermined peak value, the welding current is kept at this value.

As shown in (A) of this figure, from the time t3, as the feeding rate Fw is placed in the reverse feeding period, the welding wire is reversely fed. The short circuit is released by this reverse feeding, and hence an arc is regenerated at a time t31. The arc is regenerated mostly before or after the maximum value of the reverse feeding at the time t4. This figure shows a case where the arc is generated at the time t31 during the reverse feeding acceleration period before the peak value of the reverse feeding.

If the arc is regenerated at the time t31, the welding voltage Vw increases rapidly to an arc voltage value of several ten volts as shown in (C) of this figure. As shown in (B) of this figure, according to a narrow-part detection control of a droplet for detecting a sign of arc regeneration, the welding current Iw rapidly reduces from a time slightly before the time t31 and becomes a small current value at the arc regeneration time of t31.

As shown in (A) of this figure, from the time t31 to the time t5, the feeding rate Fw is placed in a reverse feeding state. An arc length becomes long during this period. As shown in (B) of this figure, during the period from the time t31 to the time t5, the welding current Iw increases with a predetermined inclination, then reaches a predetermined high arc current value and maintains this value for a predetermined period, and thereafter starts reducing.

As shown in (A) of this figure, the feeding rate Fw is placed in the forward feeding period from the time t5 and reaches a forward feeding peak value at a time t6. Then short circuit occurs at a time t61. During a period from the time t5 to the time t61, the welding voltage Vw reduces gradually as shown in (C) of this figure, and the welding current Iw also reduces gradually as shown in (B) of this figure.

As described above, the cycle of short circuit and arc substantially coincides with the cycle of forward feeding and reverse feeding as to the feeding rate. That is, according to this welding method, the cycle of short circuit and arc can be set to a desired value by suitably setting the cycle of forward feeding and reverse feeding as to the feeding rate. Thus, in particular, if this welding method is implemented in the large current region, the cycle of short circuit and arc can be suppressed in its variance and made substantially constant. Consequently the welding can be performed with a small generation amount of the spatter and the good bead appearance.

However, in the welding method of repeating the forward feeding and the reverse feeding as to the feeding rate, there arises a case where the short circuit does not occur at the suitable timing due to disturbance such as irregular movements of a molten pool and a distance between a power supply tip and the base material, and a change of a welding position. In this case, as the cycle of short circuit and arc does not synchronise with the cycle of forward feeding and reverse feeding, the cycle of short circuit and arc varies. A method of restoring this asynchronous state to a synchronous state is disclosed in a patent document 1.

According to an invention of the patent document 1, in a case where short circuit does not occur until a feeding rate reaches a predetermined feeding rate during feeding-rate deceleration in the forward feeding of a welding wire, cyclical change of the feeding rate is stopped and the feeding rate is controlled to a constant value of a first feeding rate. When the short circuit occurs in the forward feeding at the first feeding rate, reduction of the feeding rate from the first feeding rate is started and cyclical change of the feeding rate is restarted to perform the welding. Consequently, the asynchronous state is intended to be restored to the synchronous state.

PRIOR ART DOCUMENT

Patent Document

Patent Document 1: Japanese Patent No. 4807474

SUMMARY OF INVENTION

Problems to be Solved by Invention

According to the invention of the patent document 1, in a case where the short circuit does not occur at a suitable timing, the feeding rate is switched to a constant forward feeding rate, and the feeding rate is restored to the cyclical change when the short circuit occurs. However, according to this control, as the treatment is performed after the cycle of short circuit and arc falls into the asynchronous state with the cycle of forward feeding and reverse feeding as to the feeding rate, a welding state likely becomes unstable. Further, in the large current region, as the asynchronous state due to the disturbance occurs frequently, the welding state becomes unstable remarkably.

Accordingly an object of the present invention is to provide an arc welding power supply which can suppress a cycle of short circuit and arc falling into an asynchronous state with a cycle of forward feeding and reverse feeding as to a feeding rate, and thus perform welding stably.

Means for Solving Problems

In order to solve the above-described problem, according to the present invention, there is provided an arc welding power supply including: an output control unit configured to output a welding voltage and a welding current in correspondence to each of a short-circuiting period and an arc period; and a feeding control unit configured to increase a feeding rate of a welding wire in a forward feeding direction during a forward feeding acceleration period, to reduce the feeding rate in the forward feeding direction during a forward feeding deceleration period, to increase the feeding rate in a reverse feeding direction during a reverse feeding acceleration period, and to reduce the feeding rate in the reverse feeding direction during a reverse feeding deceleration period, wherein a short-circuit forcibly generating period is provided between the forward feeding acceleration period and the forward feeding deceleration period, and, during the short-circuit forcibly generating period, the feeding control unit increases the feeding rate with a change rate larger than a change rate during the forward feeding acceleration period and maintains a predetermined forward feeding peak value when the feeding rate reaches the peak value.

According to the present invention, during the reverse feeding acceleration period, the feeding control unit increases the feeding rate with a change rate larger than the change rate during the forward feeding acceleration period and maintains a predetermined reverse feeding peak value when the feeding rate reaches the peak value.

According to the present invention, during the reverse feeding deceleration period, the feeding control unit reduces the feeding rate by a predetermined value from the reverse feeding peak value and thereafter reduces the feeding rate with a smaller change rate.

According to the present invention, the feeding control unit provides the short-circuit forcibly generating period in a case where an average value of the feeding rate is a predetermined reference feeding rate or more.

According to the present invention, the output control unit reduces the welding current during the arc period to a value smaller than a predetermined reference current value when the feeding rate enters into the short-circuit forcibly generating period.

Advantageous Effects of Invention

According to the present invention, in particular, even if disturbance occurs in the welding of a large current region, short circuit can be surely generated during the short-circuit forcibly generating period. Thus, according to the present invention, as a cycle of short circuit and arc can be suppressed falling into an asynchronous state with a cycle of forward feeding and reverse feeding as to the feeding rate, the welding can be performed stably.

EMBODIMENTS OF INVENTION

Hereinafter embodiments according to the present invention will be explained with reference to drawings.

First Embodiment

Figure 1:
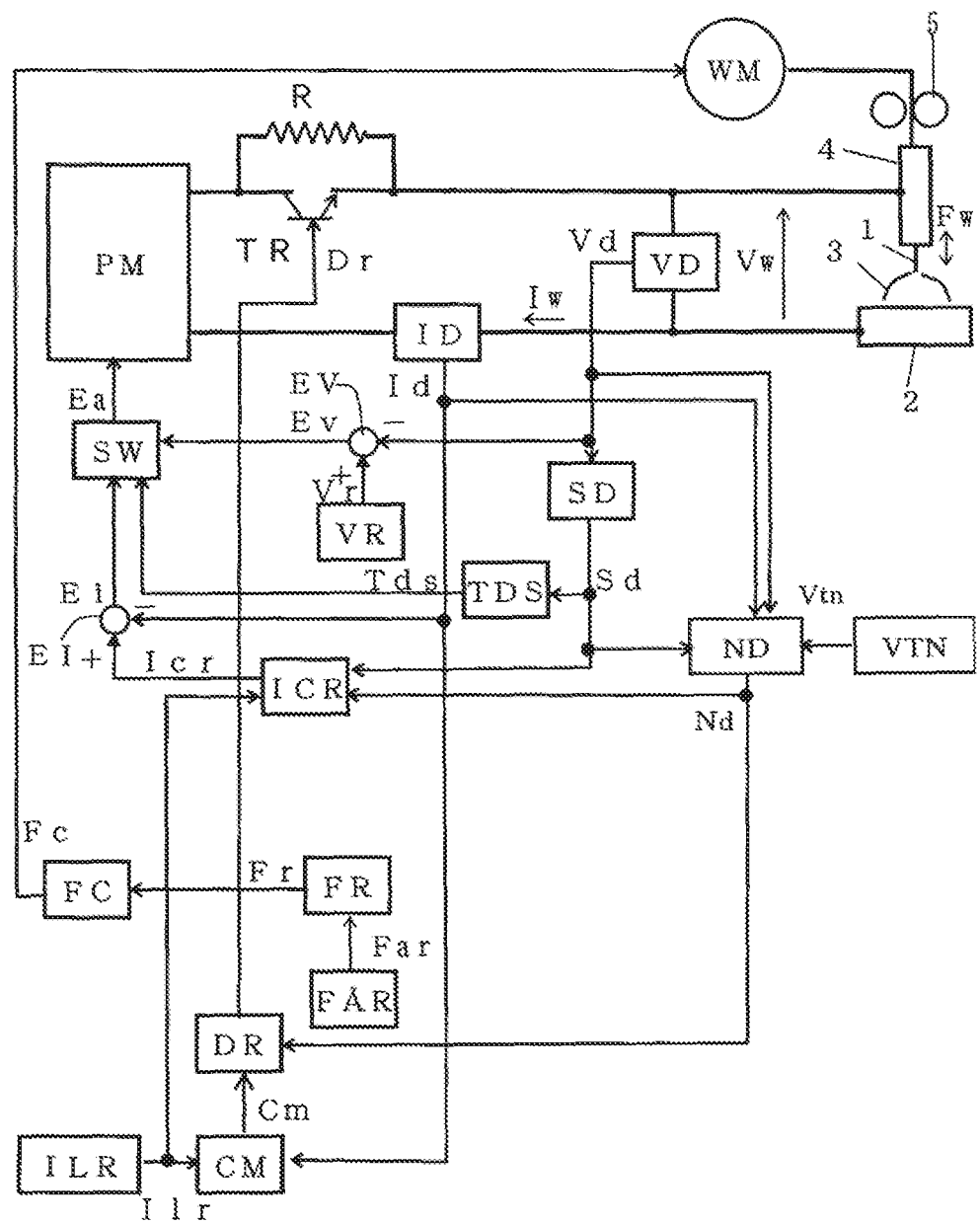
FIG. 1 A block diagram illustrating an arc welding power supply according to a first embodiment of the present invention.

FIG. 1 is a block diagram illustrating an arc welding power supply according to a first embodiment of the present invention. Hereinafter individual blocks will be explained with reference to this figure.

A power supply main circuit PM uses power of three-phase 200V or the like from a commercial power supply (not shown) as an input, to subject the input power to an output control such as an inverter control according to an error amplified signal Ea described later, and outputs a welding voltage Vw and a welding current Iw. Although not shown in the figure, this power supply main circuit PM includes a primary rectifier for rectifying the commercial power supply, a smoothing capacitor for smoothing the rectified DC, an inverter circuit for converting the smoothed DC into a high-frequency AC, a high-frequency transformer for stepping down the high-frequency AC to a voltage value suitable for welding, a secondary rectifier for rectifying the stepped-down high-frequency AC to a DC, a reactor for smoothing the rectified DC, a modulation circuit which uses the error amplified signal Ea as an input to perform a pulse width modulation control, and an inverter driving circuit which uses a pulse width modulation control signal as an input to drive switching elements of the inverter circuit.

A current decreasing resistor R is inserted between the power supply main circuit PM and a welding torch 4. The current decreasing resistor R is set to a value (about from 0.5 to 3Ω) ten times or more as large as a short-circuit load (about from 0.01 to 0.03Ω). Consequently, when the current decreasing resistor R is inserted into a current flow path according to a narrow-part detection control, energy accumulated in a DC reactor within the welding power supply and a reactor of an external cable is rapidly discharged. A transistor TR is connected in parallel to the current decreasing resistor R and controlled so as to be turned on/off according to a drive signal Dr described later.

A feeding motor WM uses a feeding control signal Fc described later as an input to feed a welding wire 1 at a feeding rate Fw in a manner of alternating forward feeding and reverse feeding cyclically. A motor having high transient responsiveness is used as the feeding motor WM. In some cases, the feeding motor WM is installed near a tip of the welding torch 4 in order to increase a change rate of the feeding rate Fw and an inversion speed of the feeding direction of the welding wire 1. Further in some cases, a push-pull feeding system is configured by using two feeding motors WM.

The welding wire 1 is fed within the welding torch 4 in accordance with rotation of a feeding roll 5 coupled to the feeding motor WM, and thus an arc 3 is generated between this wire and base material 2. The welding voltage Vw is applied between a power supply tip (not shown) within the welding torch 4 and the base material 2, and thus the welding current Iw flows.

A welding current detection circuit ID detects the welding current Iw and outputs a welding current detection signal Id. A welding voltage detection circuit VD detects the welding voltage Vw and outputs a welding voltage detection signal Vd.

A short-circuit discrimination circuit SD uses the welding voltage detection signal Vd as an input to output a short-circuit discrimination signal Sd. In a case where a value of the detection signal is less than a predetermined short-circuit/arc discrimination value (set to about 10V), the discrimination circuit determines to be a short-circuiting period and outputs the discrimination signal of a high level. In a where a value of the detection signal is the discrimination value or more, the discrimination circuit determines to be an arc period and outputs the discrimination signal of a low level.

A narrow-part detection reference-value setting circuit VTN outputs a predetermined narrow-part detection reference-value signal Vtn. A value of the narrow-part detection reference-value signal Vtn is suitably set according to welding conditions such as a welding method, an average welding current value, and material and a diameter of the welding wire 1. A narrow-part detection circuit ND uses the narrow-part detection reference-value signal Vtn, the short-circuit discrimination signal Sd, the welding voltage detection signal Vd and the welding current detection signal Id as an input to output a narrow-part detection signal Nd. The narrow-part detection circuit determines that a narrow part is formed when a voltage increasing value of the welding voltage detection signal Vd during the high level (short-circuiting period) of the short-circuit discrimination signal Sd reaches a value of the narrow-part detection reference-value signal Vtn and outputs the narrow-part detection signal of a high level. The narrow-part detection circuit outputs the narrow-part detection signal of a low level when the short-circuit discrimination signal Sd changes to the low level (arc period). Alternatively the narrow-part detection signal Nd may be changed to the high level when a differential value of the welding voltage detection signal Vd in the short-circuiting period reaches the value of the narrow-part detection reference-value signal Vtn corresponding thereto. Further, alternatively, a resistance value of a droplet may be calculated by dividing a value of the welding voltage detection signal Vd by a value of the welding current detection signal Id. Then the narrow-part detection signal Nd may be changed to the high level when a differential value of the resistance value reaches a value of the narrow-part detection reference-value signal Vtn corresponding thereto.

A low-level current setting circuit ILR outputs a predetermined low-level current setting signal Ilr. A current comparison circuit CM uses the low-level current setting signal Ilr and the welding current detection signal Id as an input, to output a current comparison signal Cm which becomes a high level in a case of Id<Ilr and a low level in a case of Id≥Ilr. A driving circuit DR uses the current comparison signal Cm and the narrow-part detection signal Nd as an input to output, to a base terminal of the transistor TR, a drive signal Dr which changes to a low level when the narrow-part detection signal Nd changes to the high level, and thereafter changes to a high level when the current comparison signal Cm changes to the high level. In this manner, the drive signal Dr changes to the low level when the narrow part is detected, thereby placing the transistor TR in the off state. Thus as the current decreasing resistor R is inserted into the current path, the welding current Iw flowing in the short-circuit load rapidly reduces. Then, when the welding current Iw thus reduced rapidly reduces to a value of the low-level current setting signal Ilr, the drive signal Dr changes to the high level, thereby placing the transistor TR in the on state. Thus as the current decreasing resistor R is short-circuited, a normal state is restored.

A current control setting circuit ICR uses the short-circuit discrimination signal Sd, the low-level current setting signal Ilr and the narrow-part detection signal Nd as an input, to perform the following processing and outputs a current control setting signal Icr. 1) During a predetermined initial period from a time where the short-circuit discrimination signal Sd changes to the high level (short circuit), a predetermined initial current setting value is outputted as the current control setting signal Icr. 2) Thereafter a value of the current control setting signal Icr is increased from the initial current setting value to a predetermined peak setting value with a predetermined inclination upon short-circuit, and the peak setting value is maintained. 3) When the narrow-part detection signal Nd changes to the high level (narrow-part detection), a value of the current control setting signal Icr is changed and kept to a value of the low-level current setting signal Ilr. 4) when the short-circuit discrimination signal Sd changes to the low level (arc), the current control setting signal Icr is increased to a predetermined high-level current setting value with a predetermined inclination upon arc and maintained at this value.

An off-delay circuit TDS uses the short-circuit discrimination signal Sd as an input, to output a delay signal Tds which is off-delayed by a predetermined delay time from a time at which the short-circuit discrimination signal changes to the low level from the high level. Thus this delay signal Tds changes to a high level in response to the start of the short-circuiting period and changes to a low level by being off-delayed by the delay time after regeneration of an arc.

A current error amplifying circuit EI amplifies an error between the current control setting signal Icr (+) and the welding current detection signal Id (−) and outputs a current error amplified signal Ei.

A voltage setting circuit VR outputs a predetermined voltage setting signal Vr for setting the welding voltage during the arc period. A voltage error amplifying circuit EV amplifies an error between the voltage setting signal Vr (+) and the welding voltage detection signal Vd (−) and outputs a voltage error amplified signal Ev.

A control switching circuit SW uses the current error amplified signal Ei, the voltage error amplified signal Ev and the delay signal Tds as an input, to output the current error amplified signal Ei as the error amplified signal Ea when the delay signal Tds is at the high level (a period from the start of the short circuit to a time elapsing the delay time after regeneration of the arc), whilst outputs the voltage error amplified signal Ev as the error amplified signal Ea when the delay signal is at the low level (arc). According to this circuit, constant current control is performed during both the short-circuiting period and the delay period, whilst constant voltage control is performed during the arc period other than these periods.

An average feeding-rate setting circuit FAR outputs an average feeding-rate setting signal Far set in advance. A feeding-rate setting circuit FR uses the average feeding-rate setting signal Far as an input to output a feeding-rate setting signal Fr of a feeding pattern, described later with reference to (A) of FIG. 2 to (A) of FIG. 4, constituted of a forward feeding acceleration period, a short-circuit forcibly generating period, a forward feeding deceleration period, a reverse feeding acceleration period and a reverse feeding deceleration period, stored in correspondence to the average feeding-rate setting signal Far. Thus an average value of the feeding pattern stored in correspondence to the average feeding-rate setting signal Far equals a value of the average feeding-rate setting signal Far.

A feeding control circuit FC uses the feeding-rate setting signal Fr as an input to output, to the feeding motor WM, a feeding control signal Fc for feeding the welding wire 1 at the feeding rate Fw corresponding to the setting value of this signal.

In this figure, the arc welding power supply includes an output control unit and a feeding control unit. The feeding control unit includes the feeding-rate setting circuit FR and the feeding control circuit FC. The output control unit includes the other circuits.

Figure 2:
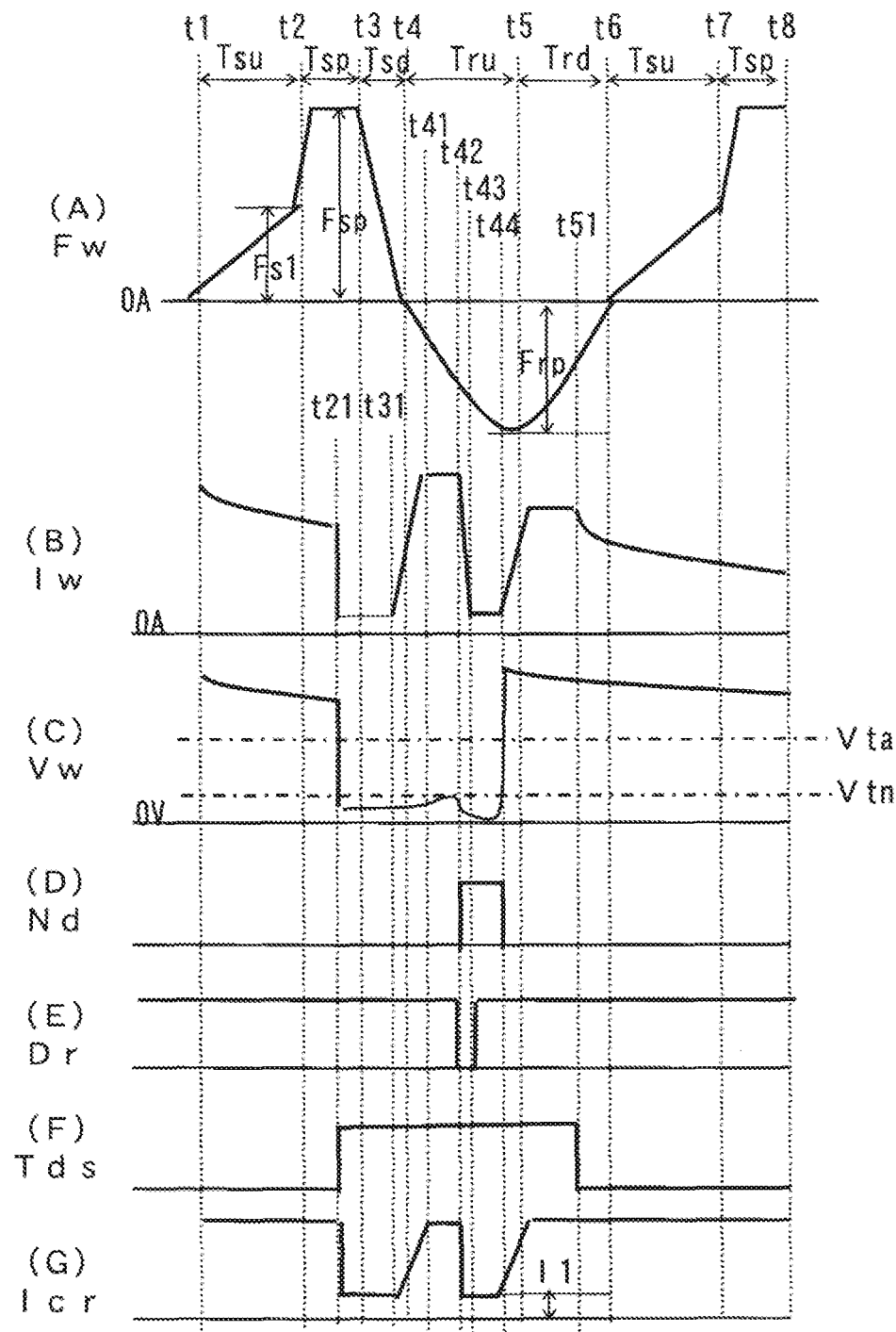
FIG. 2 A timing chart illustrating individual signals in the arc welding power supply of FIG. 1.

FIG. 2 illustrates a timing chart of individual signals in the arc welding power supply. (A) of this figure shows temporal change of the feeding rate Fw of the welding wire 1, (B) of this figure shows temporal change of the welding current Iw, (C) of this figure shows temporal change of the welding voltage Vw, (D) of this figure shows temporal change of the narrow-part detection signal Nd, (E) of this figure shows temporal change of the drive signal Dr, (F) of this figure shows temporal change of the delay signal Tds, and (G) of this figure shows temporal change of the current control setting signal Icr. Hereinafter explanation will be made with reference to this figure.

As shown in (A) of this figure, in the feeding rate Fw, positive values on an upper side than 0 represent that the welding wire is fed forwardly, and negative values on a lower side than 0 represent that the welding wire is fed reversely, in this specification, a change rate means an absolute value of the change rate.

The feeding rate Fw during the predetermined forward feeding acceleration period Tsu from a time t1 to a time t2 increases according to time lapse from 0 and reaches a predetermined first forward feeding value Fsl at the time t2. This figure shows a case where the acceleration is made linearly as an example, but may be made in a curved manner. The forward feeding acceleration period Tsu is, for example, 5 ms. In a case of typical welding in which the feeding rate Fw is a constant value of only the forward feeding, the maximum value of the feeding rate Fw is about 15 m/min. In contrast, the first forward feeding value Fsl is the twice or more of this value, e.g., 50 m/min.

During the predetermined short-circuit forcibly generating period Tsp from the time t2 to a time t3, the feeding rate Fw increases from the first forward feeding value Fsl with a change rate five tunes or more as large as that during the forward feeding acceleration period Tsu, and maintains a predetermined forward feeding peak value Fsp when reaches this peak value. The short-circuit forcibly generating period Tsp is, for example, 1.5 ms. The forward feeding peak value Fsp is a value larger than the first forward feeding value Fsl, that is, 100 m/min, for example. The reason for setting the large change rate is to rapidly increase the feeding rate to the forward feeding peak value Fsp. The welding wire is rapidly short-circuited with a molten pool by maintaining the feeding rate at the forward feeding peak value Fsp of the large value. That is, the short circuit is forcibly generated.

The feeding rate Fw during the predetermined forward feeding deceleration period Tsd from the time t3 to a time t4 reduces from the forward feeding peak value Fsp with a change rate larger than that during the forward feeding acceleration period Tsu, and reaches 0 at the time t4. This change rate is made large in order to set the short-circuiting period to a desired value and stabilize a welding state. The forward feeding deceleration period Tsd is, for example, 1 ms.

The feeding rate Fw during the predetermined reverse feeding acceleration period Tru from the time t4 to a time t5 increases sinusoidally from 0 and reaches a predetermined reverse feeding peak value Frp at the time t5. Although this figure shows the case of accelerating sinusoidally, the feeding rate may be increased linearly or in the form of a curve other than the sine wave. The reverse feeding acceleration period Tru is, for example, 3 ms. The reverse feeding peak value Frp is, for example, −50 m/min.

The feeding rate Fw during the predetermined reverse feeding deceleration period Trd from the time t5 to a time t6 reduces sinusoidally from the reverse feeding peak value Frp and reaches 0 at the time t6. Although this figure shows the case of accelerating sinusoidally, the feeding rate may be increased linearly or in the form of a curve other than the sine wave. The reverse feeding deceleration period Trd is, for example, 3 ms.

A period from the time t6 to a time t7 is the forward feeding acceleration period Tsu again, and a period from the time t7 to a time t8 is the short-circuit forcibly generating period Tsp again. In this manner, the feeding rate Fw changes repeatedly with a single cycle from the time t1 to the time t6. An average value of the feeding rate Fw shown in (A) of this figure corresponds to the feeding rate Fw in the typical welding fed at the constant feeding rate. The average value of the feeding rate Fw is necessarily positive. In the example of the aforesaid numerical values, the average value of the feeding rate Fw is about 10 m/min (an average welding current is 300 A).

As the period from the time t1 to the time t2 is the forward feeding acceleration period Tsu, the feeding rate Fw is increased in the forward feeding direction as shown in (A) of this figure. As an arc is generated during this period, the welding current Iw flows as shown in (B) of this figure and the welding voltage Vw becomes an arc voltage value of several ten volts as shown in (C) of this figure, in this period.

As the short-circuit forcibly generating period Tsp starts at the time t2, as shown in (A) of this figure, the feeding rate Fw rapidly increases in the forward feeding direction and reaches the large forward feeding peak value Fsp. Thus, at a time t21 during the short-circuit forcibly generating period Tsp, the welding wire contacts the base material and is placed in the short circuit state. Upon start of the short circuit state, the welding voltage Vw rapidly reduces to a short-circuit voltage value of a few volts as shown in (C) of this figure. When discrimination is made that this welding voltage Vw reduces lower than a short-circuit/arc discrimination value Vta, the delay signal Tds is changed to the high level from the low level as shown in (F) of this figure. In response to this, as shown in (G) of this figure, the current control setting signal Icr changes at the time t21 from the predetermined high-level current setting value to the predetermined initial current setting value as a small value.

As the forward feeding deceleration period Tsd starts from the time t3, the feeding rate Fw rapidly reduces as shown in (A) of this figure. Then as the reverse feeding acceleration period Tru starts from the time t4, the feeding rate Fw is switched to the reverse feeding direction. As shown in (G) of this figure, the current control setting signal Icr is the initial current setting value during the predetermined initial period from the time t21 to a time t31, increases with the predetermined inclination upon short-circuit during a period from the time t31 to a time t41, and is the predetermined peak setting value during a period from the time t41 to a time t42. As descried above, as the constant current control is performed during the short-circuiting period, the welding current Iw is controlled to a value corresponding to the current control setting signal Icr. Thus as shown in (B) of this figure, the welding current Iw rapidly reduces at the time t21 from the welding current during the arc period, is an initial current value during the initial period from the time t21 to the time t31, increases with an inclination upon short-circuit during the period from the time t31 to the time t41, and is a peak value during the period from the time t41 to the time t42. For example, the initial period is set to 1 ms, the initial current is set to 50 A, the inclination upon short-circuit is set to 400 A/ms and the peak value is set to 450 A. As shown in (D) of this figure, the narrow-part detection signal Nd is the high level during a period from the time t42 to a time t44 described later and is the low level during a period other than this period. As shown in (E) of this figure, the drive signal Dr is the low level during a period from the time t42 to a time t43 described later and is the high level during a period other than this period. Accordingly, during the period before the time t42 in this figure, as the drive signal Dr is the high level, the transistor TR of FIG. 1 is placed in the on state. Thus as the current decreasing resistor R is short-circuited, the power supply is placed in the same state as a normal consumable electrode type arc welding power supply.

As shown in (C) of this figure, the welding voltage Vw increases almost from the time t41 at which the welding current Iw reaches the peak value. This is because a narrow-part is gradually formed at a droplet due to the reverse feeding of the welding wire and a pinch force of the welding current Iw.

As shown in (C) of this figure, if the welding voltage Vw rapidly increases and a voltage increasing value ΔV from a voltage value during the initial period equals the predetermined narrow-part detection reference value Vtn at the time t42, a narrow part is detected. Then as shown in (D) of this figure, the narrow-part detection signal Nd changes to the high level. In response to this, as shown in (E) of this figure, as the drive signal Dr becomes the low level, the transistor TR of FIG. 1 is turned off and hence the current decreasing resistor R is inserted into the current path. Simultaneously as shown in (G) of this figure, the current control setting signal Icr reduces to the value of the low-level current setting signal Ilr. Thus as shown in (B) of this figure, the welding current Iw rapidly reduces to a low-level current value Il from the peak value. Then, when the welding current Iw reduces to the low-level current value Il at the time t43, the drive signal Dr is restored to the high level as shown in (E) of this figure. Thus the transistor TR of FIG. 1 is placed in the on state and hence the current decreasing resistor R is short-circuited. As shown in (B) of this figure, as the current control setting signal Icr is maintained to the low-level current setting signal Ilr, the welding current Iw maintains the low-level current value Il until an arc is regenerated at the time t44. Accordingly the transistor TR is placed in the off state only during a period from the detection of the narrow part at the time t42 to the reduction of the welding current Iw to the low-level current value Il at the time t43 As shown in (C) of this figure, as the welding current Iw becomes small, the welding voltage Vw once reduces from the time t42 and thereafter increases rapidly. The low-level current value Il is set to, for example, 50 A.

If the narrow part is promoted due to the reverse feeding of the welding wire and the pinch force of the flowing of the welding current Iw and an arc is regenerated at the time t44, a value of the welding voltage Vw becomes the short-circuit/arc discrimination value Vta or more as shown in (C) of this figure.

As the reverse feeding deceleration period Trd starts from the time t5 immediately after the regeneration of the arc, the feeding rate Fw reduces while maintains the reverse feeding state, as shown in (A) of this figure. If the arc is regenerated at the time t44, as shown in (G) of this figure, a value of the current control setting signal Icr increases with the predetermined inclination upon arc from the value of the low-level current setting signal then reaches the high-level current setting value, and thereafter maintains this value. As shown in (F) of this figure, the delay signal Tds maintains the high level until a time t51 at which a predetermined delay period Td elapses after the regeneration of the arc at the time t44. Thus as the welding power supply is subjected to the constant current control until the time t51, as shown in (B) of this figure, the welding current Iw increases with an inclination upon arc from the time t44, then reaches a high-level current value and maintains this value until the time t51. As shown in (C) of this figure, the welding voltage Vw is placed in a high-level voltage value state during the delay period Td from the time t44 to the time t51. As shown in (D) of this figure, the narrow-part detection signal Nd changes to the low level due to the regeneration of the arc at the time t44. For example, the inclination upon arc is set to 400 A/ms, the high-level current value is set to 450 A and the delay period Td is set to 2 ms.

As shown in (F) of this figure, the delay signal Tds changes to the low level at the time t51. As a result, the welding power supply is switched to the constant voltage control from the constant current control. Until the tune t6 from the time t44 at which the arc is regenerated, as the welding wire is reversely fed, the arc length becomes longer gradually. As the forward feeding acceleration period Tsu starts from the time t6, the feeding rate Fw is switched to the forward feeding as shown in (A) of this figure. If the welding power supply is switched to the constant voltage control at the time t51, the welding current Iw gradually reduces from the high-level current value as shown in (B) of this figure. Similarly, the welding voltage Vw gradually reduces from the high-level voltage value as shown in (C) of this figure.

As described above, according to the narrow-part detection control, the welding current Iw is rapidly reduced by inserting the current decreasing resistor in the current path upon detection of the narrow part at the time t42. Consequently, the current value upon the regeneration of the arc at the time t44 can be controlled to a small value. Thus a generation amount of spatter can be reduced to a large extent.

As described above, according to the first embodiment, the short circuit is surely generated within the short-circuit forcibly generating period Tsp. Although this figure shows the case where an arc is generated within the reverse feeding acceleration period Tru before the time t5, an arc is sometimes generated within the reverse feeding deceleration period Trd after the time t5.

According to the first embodiment, the short-circuit forcibly generating period is provided between the forward feeding acceleration period and the forward feeding deceleration period. During the short-circuit forcibly generating period, the feeding rate is increased with the change rate larger than that during the forward feeding acceleration period, and is kept to the predetermined forward feeding peak value when the feeding rate reaches this value. Consequently, in particular, even if disturbance occurs in the welding of the large current region, short circuit can be surely generated during the short-circuit forcibly generating period. In this manner, according to the embodiment, as the cycle of short circuit and arc can be suppressed falling into an asynchronous state with the cycle of forward feeding and reverse feeding as to the feeding rate, the welding can be performed stably.

Second Embodiment

In a second embodiment according to the present invention, during the reverse feeding acceleration period, the feeding rate is increased with a change rate larger than that during the forward feeding acceleration period and is kept to a predetermined reverse feeding peak value when the feeding rate reaches this value.

A block diagram of an arc welding power supply according to the second embodiment is same as that of FIG. 1. However, a feeding pattern of the feeding rate set in advance in the feeding-rate setting circuit FR differs as shown in (A) of FIG. 3.

Figure 3:
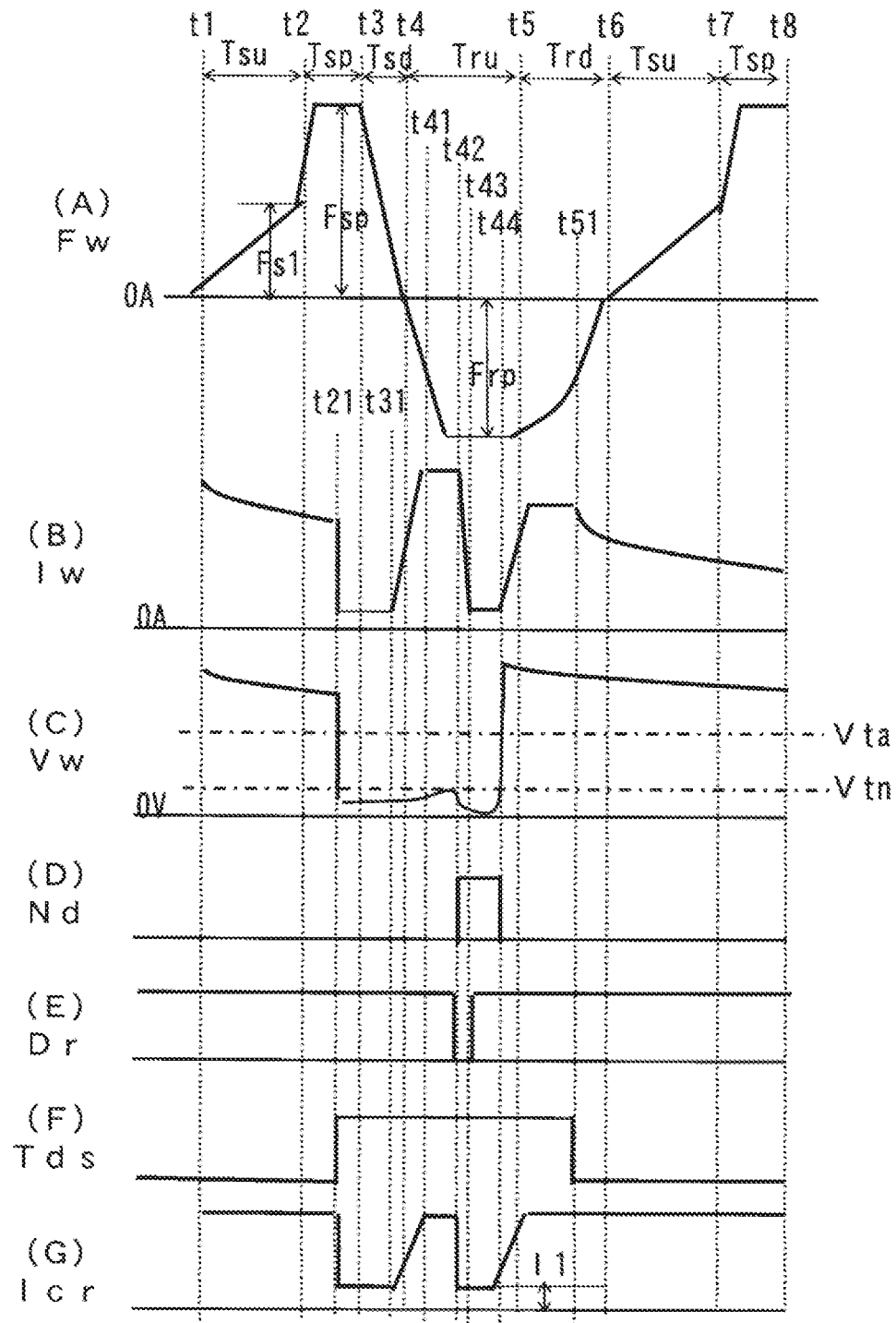
FIG. 3 A timing chart illustrating individual signals in an arc welding power supply according to a second embodiment of the present invention.

FIG. 3 is a timing chart of individual signals in the arc welding power supply according to the second embodiment of the present invention. (A) of this figure shows temporal change of the feeding rate Fw of the welding wire 1, (B) of this figure shows temporal change of the welding current Iw, (C) of this figure shows temporal change of the welding voltage Vw, (D) of this figure shows temporal change of the narrow-part detection signal Nd, (E) of this figure shows temporal change of the drive signal Dr, (F) of this figure shows temporal change of the delay signal Tds, and (G) of this figure shows temporal change of the current control setting signal Icr. This figure corresponds to FIG. 2, and explanation of operations of this figure same as those of FIG. 2 will not be repeated. Hereinafter different operations will be explained with reference to this figure.

The feeding pattern of the feeding rate Fw shown in (A) of this figure differs from FIG. 2 only as to a change during the reverse feeding acceleration period Tru from a time t4 to a time t5. The feeding rate Fw during the reverse feeding acceleration period Tru from the time t4 to the time t5 increases from 0 in the reverse feeding direction with a change rate larger than that during the forward feeding acceleration period Tsu, and maintains a predetermined reverse feeding peak value Frp when reaches this peak value. Although this figure shows the case of accelerating linearly, the feeding rate may be increased in the form of a curve. The reverse feeding acceleration period Tru is, for example, 2.5 ms. The reverse feeding peak value Frp is, for example, −50 m/min. The change rate is set to the large value so that the feeding rate quickly reaches the reverse feeding peak value Frp. Consequently, arc regeneration timings can be concentrated within a period where the reverse feeding peak value Frp is maintained.

As shown in (A) of this figure, as the reverse feeding acceleration period Tru starts from the time t4, the feeding rate Fw is switched in the reverse feeding state and rapidly increases with a change rate larger than that during the forward feeding acceleration period Tsu, and maintains the reverse feeding peak value Frp when reaches this peak value. As shown in (B) of this figure, the welding current Iw rapidly reduces at a time t21 from the welding current during the arc period, maintains an initial current value during the initial period from the time t21 to a time t31, increases with an inclination upon short-circuit during a period from the time t31 to a time t41, and maintains a peak value during a period from the time t41 to a time t42. The peak-value period of the welding current Iw overlaps partially with the period where the feeding rate Fw maintains the reverse feeding peak value Frp. Thus narrow-part promotion effect due to the high-speed reverse feeding of the welding wire is superimposed on narrow-part promotion effect due to the flowing of the welding current Iw of the large current value. As a result, the arc regeneration timings (time t44) concentrate within this period where the feeding rate Fw becomes the reverse feeding peak value Frp.

According to the second embodiment, during the reverse feeding acceleration period, the feeding rate is increased with the change rate larger than that during the forward feeding acceleration period and is kept to the predetermined reverse feeding peak value when the feeding rate reaches this peak value. Consequently, the following effects can be achieved in addition to the effects of the first embodiment. That is, according to the second embodiment, the feeding rate rapidly reaches the reverse feeding peak value by setting the change rate of the feeding rate to the large value upon the start of the reverse feeding acceleration period. In this manner, the arc regeneration timings can be concentrated within the period where the reverse feeding peak value is maintained. As a result, according to the second embodiment, the cycle of short circuit and arc can be placed in the synchronous state more stably with the cycle of forward feeding and reverse feeding of the feeding rate.

Third Embodiment

In a third embodiment according to the present invention, during the reverse feeding deceleration period, the feeding rate is reduced by a predetermined value from the reverse feeding peak value and thereafter reduced with a smaller change rate.

A block diagram of an arc welding power supply according to the third embodiment is same as that of FIG. 1. However, a feeding pattern of the feeding rate set in advance in the feeding-rate setting circuit FR differs as shown in (A) of FIG. 4.

Figure 4:
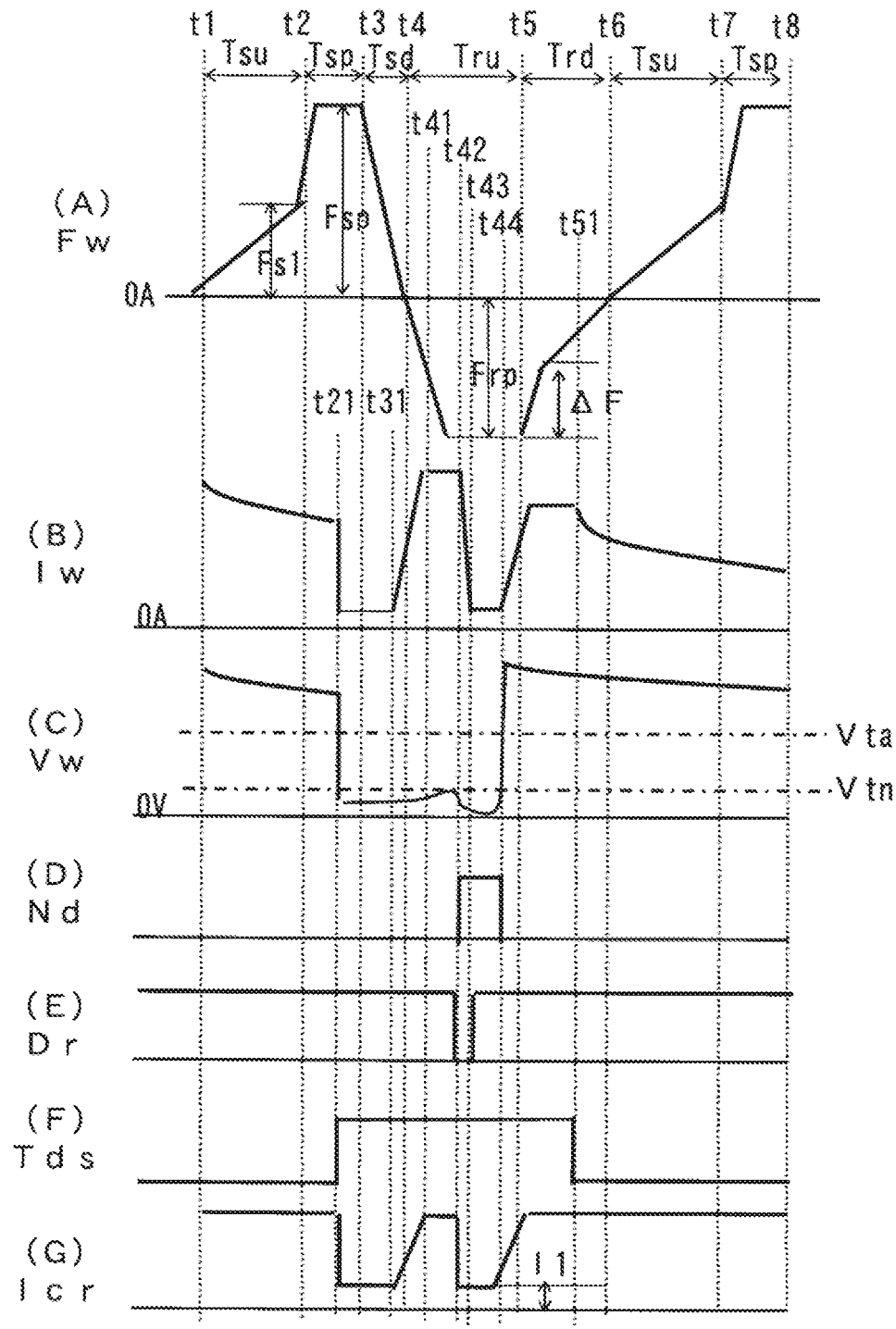
FIG. 4 A timing chart illustrating individual signals in an arc welding power supply according to a third embodiment of the present invention.

FIG. 4 is a timing chart of individual signals in the arc welding power supply according to the third embodiment of the present invention. (A) of this figure shows temporal change of the feeding rate Fw of the welding wire 1, (B) of this figure shows temporal change of the welding current Iw, (C) of this figure shows temporal change of the welding voltage Vw, (D) of this figure shows temporal change of the narrow-part detection signal Nd, (E) of this figure shows temporal change of the drive signal Dr, (F) of this figure shows temporal change of the delay signal Tds, and (G) of this figure shows temporal change of the current control setting signal Icr. This figure corresponds to FIG. 3, and explanation of operations of this figure same as those of FIG. 3 will not be repeated. Hereinafter different operations will be explained with reference to this figure.

The feeding pattern of the feeding rate Fw shown in (A) of this figure differs from FIG. 3 only as to a change during the reverse feeding deceleration period Trd from a time t5 to a time t6. The feeding rate Fw during the predetermined reverse feeding deceleration period Trd from the time t5 to the time t6 reduces by a predetermined value ΔF from a reverse feeding peak value Frp, and thereafter reduces with a smaller change rate. Although this figure shows the case of decelerating in the form of a polygonal line, the feeding rate may be reduced in the form of a curve. The reverse feeding acceleration period Tru is, for example, 3 ms.

As shown in (A) of this figure, as the reverse feeding deceleration period Trd starts from the time t5, the feeding rate Fw reduces by the predetermined value ΔF from the reverse feeding peak value Frp, and thereafter reduces with the smaller change rate. As shown in (B) of this figure, the welding current Iw increases with the inclination upon arc from a time t44, then reaches the high-level current value and maintains this value until a time t51. Thus, during the reverse feeding deceleration period Trd, as the welding wire is reversely fed in a state where an arc is generated, the arc length is made longer. Simultaneously a tip of the welding wire is molten and so the droplet becomes larger gradually. In this case, if the feeding rate Fw immediately after the start of the reverse feeding deceleration period Trd is large, as a large force acts on the droplet in the reverse feeding direction, the droplet is placed in a lifted-up state in the reverse feeding direction. In such the state, a droplet shift state likely becomes unstable. In view of this, the feeding rate Fw is rapidly reduced by the predetermined value ΔF immediately after the start of the reverse feeding deceleration period Trd, whereby the droplet is prevented being fallen in the lifted-up state.

According to the third embodiment, during the reverse feeding deceleration period, the feeding rate is reduced by the predetermined value from the reverse feeding peak value and thereafter reduced with the smaller change rate. Consequently, the following effects can be achieved in addition to the effects of the first and second embodiments. That is, according to the third embodiment, in the case of elongating the arc length during the reverse feeding deceleration period, as the droplet is suppressed being fallen in the lifted-up state in the reverse feeding direction, the droplet shift state can be further stabilized.

Fourth Embodiment

In a fourth embodiment according to the present invention, the short-circuit forcibly generating period is provided in a case where an average value of the feeding rate is a predetermined reference feeding rate or more. That is, the short-circuit forcibly generating period is not provided in a case where an average value of the feeding rate is less than the reference feeding rate but provided only in a case where the average value is the reference feeding rate or more.

Figure 5:
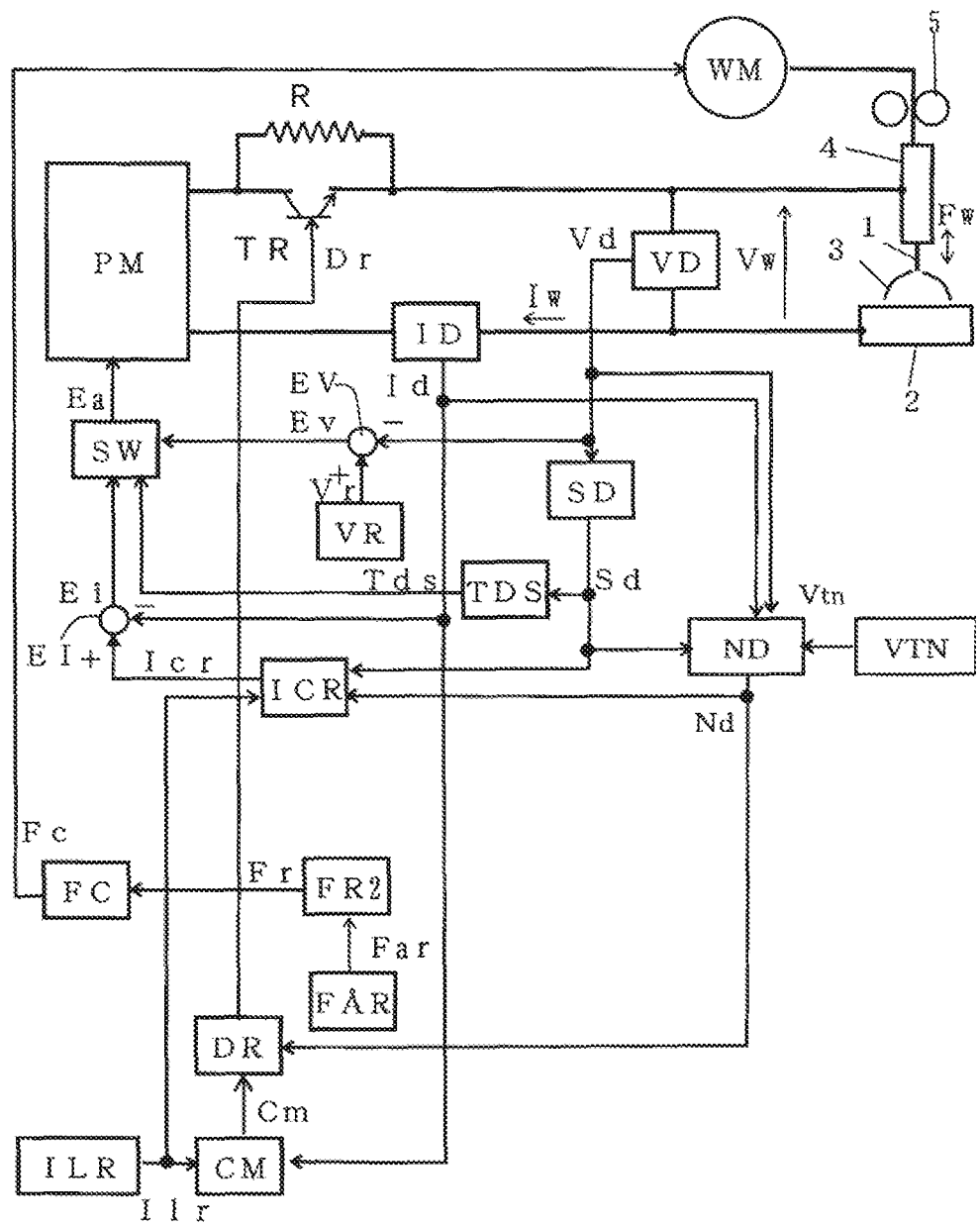
FIG. 5 A block diagram illustrating an arc welding power supply according to a fourth embodiment of the present invention.

FIG. 5 is a block diagram illustrating an arc welding power supply according to the fourth embodiment of the present invention. This figure corresponds to FIG. 1, and blocks identical to those of FIG. 1 are referred to by the same symbols, with explanation thereof being omitted. In this figure, the feeding-rate setting circuit FR of FIG. 1 is replaced by a second feeding-rate setting circuit FR2. Hereinafter individual blocks will be explained with reference to this figure.

Figure 8:
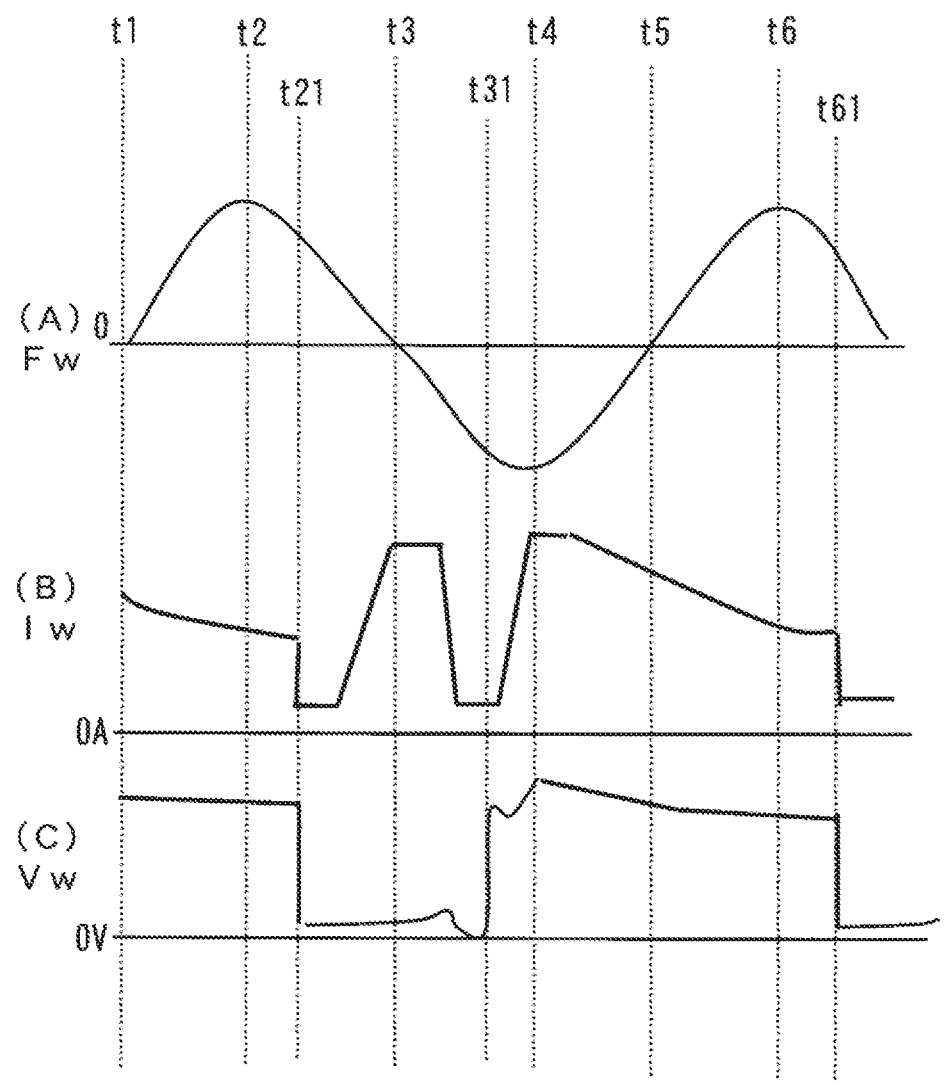
FIG. 8 A waveform diagram of a welding method according to a related art in which forward feeding and reverse feeding as to a feeding rate is repeated cyclically.

The second feeding-rate setting circuit FR2 uses the average feeding-rate setting signal Far as an input, to perform the following processing and outputs a feeding-rate setting signal Fr. 1) In a case where a value of the average feeding-rate setting signal Far is less than the predetermined reference feeding rate, the second feeding-rate setting circuit outputs the feeding-rate setting signal Fr of the feeding rate pattern, described above with reference to (A) of FIG. 8, constituted of the forward feeding acceleration period, the forward feeding deceleration period, the reverse feeding acceleration period and the reverse feeding deceleration period, stored in correspondence to the average feeding-rate setting signal Far. 2) In a case where the value of the average feeding-rate setting signal Far is the predetermined reference feeding rate or more, the second feeding-rate setting circuit outputs the feeding-rate setting signal Fr of the feeding rate pattern, described above with reference to (A) of FIG. 2 to (A) of FIG. 4, constituted of the forward feeding acceleration period, the short-circuit forcibly generating period, the forward feeding deceleration period, the reverse feeding acceleration period and the reverse feeding deceleration period, stored in correspondence to the average feeding-rate setting signal Far.

The reference feeding rate is set to a value for dividing into a small current region having a small variance of the cycle of the short-circuiting period and the arc period and a large current region having a large variance of the cycle. For example, in a case where the welding wire is a steel wire and a diameter thereof is 1.2 mm, the reference feeding rate is set to 4 m/min.

A timing chart of individual signals in the welding power supply according to the fourth embodiment shown in FIG. 5 is same as those of FIG. 1 and FIGS. 2 to 4, and hence the explanation thereof is omitted. That is, the timing chart in the case where a value of the average feeding-rate setting signal Far is less than the reference feeding rate is same as that of FIG. 1, whilst the timing chart in the case where a value of the average feeding-rate setting signal is the reference feeding rate or more is same as those of FIGS. 2 to 4.

According to the fourth embodiment, the short-circuit forcibly generating period is provided in the case where an average value of the feeding rate is the predetermined reference feeding rate or more. Consequently, according to the fourth embodiment of the present invention, the following effects can be achieved in addition to the effects of the first to third embodiments. In the welding of the small current region where an average value of the feeding rate is less than the reference feeding rate, if the short-circuit forcibly generating period is provided, a generation amount of spatter may increase depending on a work. In the welding of the small current region, as the cycle of short circuit and arc is scarcely be placed in the asynchronous state with the cycle of forward feeding and reverse feeding as to the feeding rate, mostly it is not necessary to provide the short-circuit forcibly generating period.

Fifth Embodiment

In a fifth embodiment according to the present invention, when the feeding rate enters into the short-circuit forcibly generating period, the welding current during the arc period is reduced to a value smaller than a predetermined reference current value.

Figure 6:
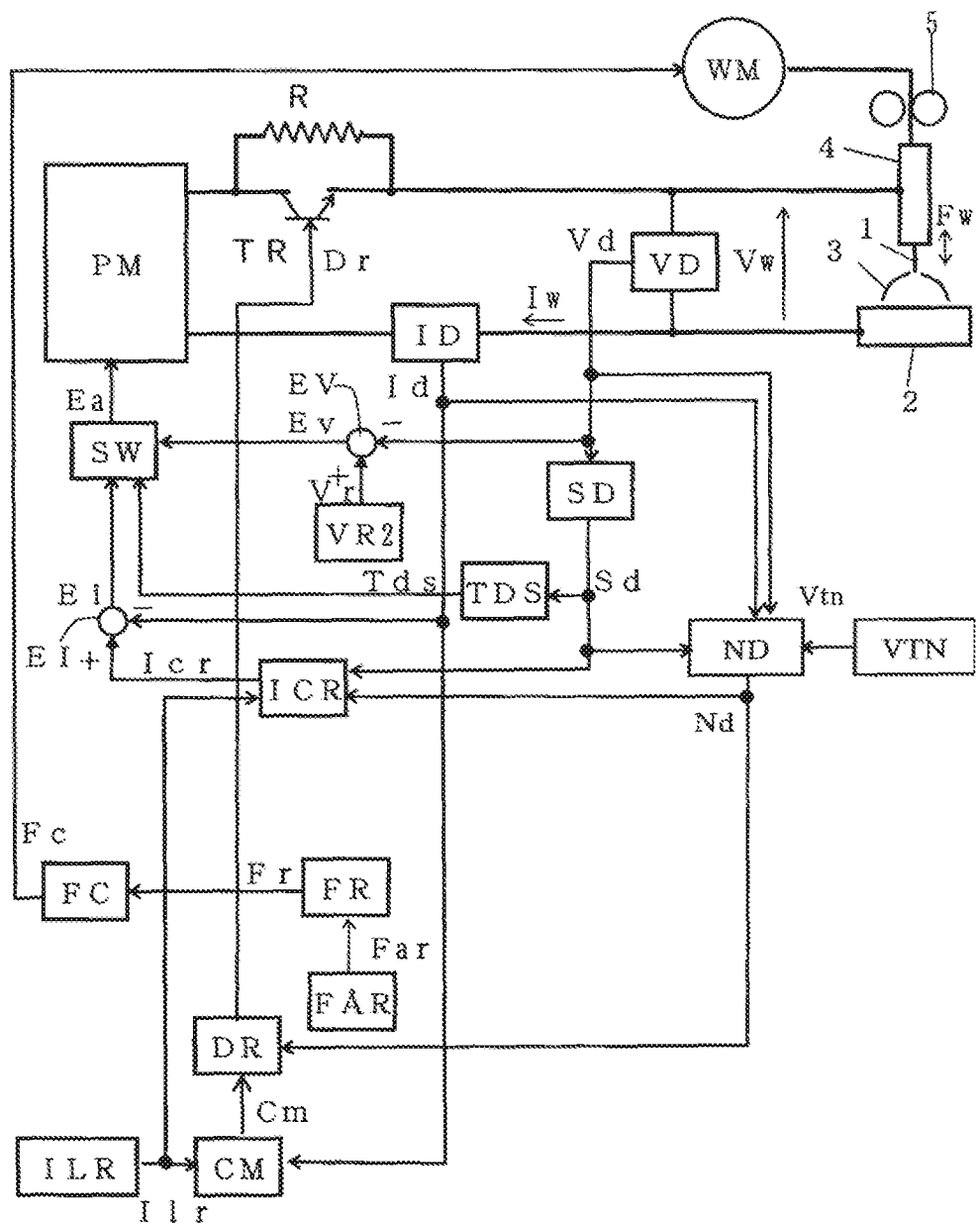
FIG. 6 A block diagram illustrating an arc welding power supply according to a fifth embodiment of the present invention.

FIG. 6 is a block diagram illustrating an arc welding power supply according to the fifth embodiment of the present invention. This figure corresponds to FIG. 1, and blocks identical to those of FIG. 1 are referred to by the same symbols, with explanation thereof being omitted. In this figure, the voltage setting circuit VR of FIG. 1 is replaced by a second voltage setting circuit VR2. Hereinafter individual blocks will be explained with reference to this figure.

The second voltage setting circuit VR2 uses the feeding-rate setting signal Fr as an input to determine from a value of the feeding-rate setting signal Fr whether or not the signal is in the short-circuit forcibly generating period. The second voltage setting circuit outputs a voltage setting signal Vr of a predetermined voltage setting value when the signal is not in the short-circuit forcibly generating period, whilst outputs the voltage setting signal Vr of a predetermined low voltage setting value smaller than the voltage setting value when the signal is in the short-circuit forcibly generating period. This low voltage setting value is set so that the welding current during the arc period becomes smaller than the predetermined reference current value. The reference current value is set to, for example, 100 A.

Figure 7:
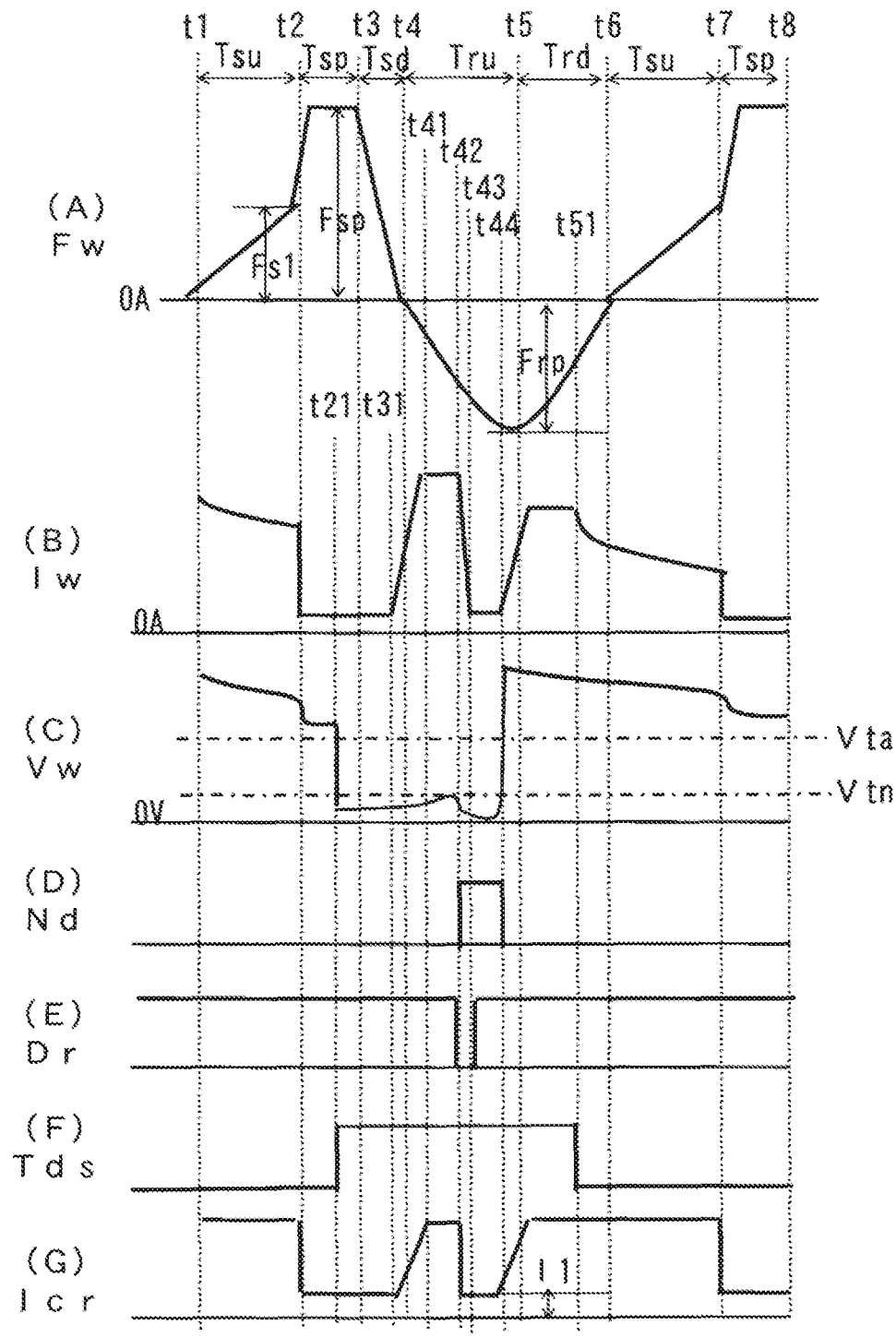
FIG. 7 A timing chart illustrating individual signals in the arc welding power supply of FIG. 6.

FIG. 7 illustrates a timing chart of individual signals in the arc welding power supply described with reference to FIG. 6. (A) of this figure shows temporal change of the feeding rate Fw of the welding wire 1, (B) of this figure shows temporal change of the welding current (C) of this figure shows temporal change of the welding voltage Vw, (D) of this figure shows temporal change of the narrow-part detection signal Nd, (E) of this figure shows temporal change of the drive signal Dr, (F) of this figure shows temporal change of the delay signal Tds, and (G) of this figure shows temporal change of the current control setting signal Icr. This figure corresponds to FIG. 2, and as operations of periods other than a period from a time t2 to a time t21 are same as those of FIG. 2, the explanation thereof will be omitted. Hereinafter different operations will be explained with reference to this figure.

As shown in (A) of this figure, if the feeding rate Fw enters into the short-circuit forcibly generating period Tsp at the time t2, the second voltage setting circuit VR2 of FIG. 6 switches the voltage setting signal Vr to the predetermined low voltage setting value. Thus, as shown in (C) of this figure, during the arc period from the time t2 to the time t21 at which short circuit occurs, the welding voltage Vw rapidly reduces and becomes a small value. In response to this, as shown in (B) of this figure, the welding current Iw also reduces rapidly and becomes a small value smaller than the predetermined reference current value. If the welding current Iw is made small in this manner, short circuit is more likely generated and a generation amount of spatter upon generation of the short circuit can be reduced.

Although the explanation is made that the fifth embodiment is based on the first embodiment, as an operation of this embodiment based on each of the second to fourth embodiments is the same, the explanation thereof will be omitted.

According to the fifth embodiment, when the feeding rate enters into the short-circuit forcibly generating period, the welding current during the arc period is reduced to a value smaller than the predetermined reference current value. Consequently, according to the fifth embodiment, the following effects can be achieved in addition to the effects of the first to fourth embodiments. In the fifth embodiment, as the welding current during the arc period in the short-circuit forcibly generating period is made small, short circuit is more likely generated and a generation amount of spatter upon generation of the short circuit can be reduced. During the arc period, if the period where the welding current is maintained at the small value becomes too long, bead appearance degrades. In the fifth embodiment, as the welding current is reduced after entering in the short-circuit forcibly generating period, the current reduced period does not become such a long term influencing on the bead appearance.

INDUSTRIAL APPLICABILITY

According to the present invention, in particular, even if disturbance occurs in the welding of the large current region, short circuit can be surely generated during the short-circuit forcibly generating period. Thus, according to the present invention, as the cycle of short circuit and arc can be suppressed falling into the asynchronous state with the cycle of forward feeding and reverse feeding as to the feeding rate, the welding can be performed stably.

Although the present invention is explained with reference to the particular embodiments, the present invention is not limited thereto but the embodiments may be changed in various manners within a range not departing from the technical concept disclosed in the present invention.

This application is based on Japanese Patent Application (Japanese Patent Application No. 2014-028675) filed on Feb. 18, 2014, the content of which is incorporated herein by reference.

DESCRIPTION OF REFERENCE NUMERALS 1 welding wire
2 base material
3 arc
4 welding torch
5 feeding roll
CM current comparison circuit
Cm current comparison signal
DR driving circuit
Dr drive signal
Ea error amplified signal
EI current error amplifying circuit
Ei current error amplified signal
EV voltage error amplifying circuit Ev voltage error amplified signal
FAR average feeding-rate setting circuit
Far average feeding-rate setting signal
FC feeding control circuit
Fc feeding control signal
FR feeding-rate setting circuit
Fr feeding-rate setting signal
FR2 second feeding-rate setting circuit
Frp reverse feeding peak value
Fs1 first forward feeding value
Fsp forward feeding peak value
Fw feeding rate
ICR current control setting circuit
Icr current control setting signal
ID welding current detection circuit
Id welding current detection signal
Il low-level current value
ILR low-level current setting circuit
Ilr low-level current setting signal
Iw welding current
ND narrow-part detection circuit
Nd narrow-part detection signal
PM power supply main circuit
R current decreasing resistor
SD short-circuit discrimination circuit
Sd short-circuit discrimination signal
SW control switching circuit
Td delay period
TDS off-delay circuit
Tds delay signal
R transistor
Trd reverse feeding deceleration period
Tru reverse feeding acceleration period
Tsd forward feeding deceleration period
Tsp short-circuit forcibly generating period
Tsu forward feeding acceleration period
VD welding voltage detection circuit
Vd welding voltage detection signal
VR voltage setting circuit
Vr voltage setting signal
VR2 second voltage setting circuit
Vta short-circuit/arc discrimination value
VTN narrow-part detection reference-value setting circuit
Vtn narrow-part detection reference-value (signal)
Vw welding voltage
WM feeding motor
ΔF predetermined value
ΔV voltage increasing value

The invention claimed is:

1. An arc welding power supply comprising:
an output control unit configured to output a welding voltage and a welding current in correspondence to each of a short-circuiting period and an arc period; and
a feeding control unit configured to increase a feeding rate of a welding wire in a forward feeding direction during a forward feeding acceleration period at a first positive acceleration, to reduce the feeding rate in the forward feeding direction during a forward feeding deceleration period, to increase the feeding rate in a reverse feeding direction during a reverse feeding acceleration period, and to reduce the feeding rate in the reverse feeding direction during a reverse feeding deceleration period,
wherein a short-circuit forcibly generating period is provided between the forward feeding acceleration period and the forward feeding deceleration period, and, during the short-circuit forcibly generating period, the feeding control unit increases the feeding rate with a change rate at a second positive acceleration larger than a change rate during the forward feeding acceleration period so that the second positive acceleration is greater than the first positive acceleration and maintains a predetermined forward feeding peak value when the feeding rate reaches the peak value, and
wherein the start of the second positive acceleration during the short-circuit forcibly generating period is continuous with the end of the first positive acceleration during the forward feeding acceleration period without any gap therebetween.

2. The arc welding power supply according to claim 1, wherein during the reverse feeding acceleration period, the change rate of the feeding rate is increased by the feeding control unit to be larger than the change rate during the forward feeding acceleration period and the feeding control unit maintains a predetermined reverse feeding peak value when the feeding rate reaches the predetermined reverse feeding peak value.

3. The arc welding power supply according to claim 1, wherein during the reverse feeding deceleration period, the feeding control unit reduces the feeding rate by a predetermined value from the reverse feeding peak value and thereafter reduces the feeding rate with a smaller change rate.

4. The arc welding power supply according to claim 1, wherein the feeding control unit provides the short-circuit forcibly generating period in a case where an average value of the feeding rate is a predetermined reference feeding rate or more.

5. The arc welding power supply according to claim 1, wherein the output control unit reduces the welding current during the arc period to a value smaller than a predetermined reference current value when the feeding rate enters into the short-circuit forcibly generating period.

6. The arc welding power supply according to claim 1, wherein the output control unit includes a power supply main circuit, wherein the output control unit controls the power supply main circuit to output the welding voltage and the welding current to a welding torch; and
wherein the arc welding power supply further comprises:
a transistor; and
a current-reducing resistor connected between the power supply main circuit and the welding torch,
the transistor being connected in parallel to the current-reducing resistor and when turned on, places the current-reducing resistor into a current flow from the power supply main circuit to the welding torch, and
the current-reducing resistor reducing the welding current to the welding torch when the transistor is turned on.

7. The arc welding power supply according to claim 1, wherein the feeding control unit controls the feeding rate so that the feeding rate is a linear function during forward feeding in the forward feeding direction, and a sinusoidal function for reverse feeding in the reverse feeding direction.

8. The arc welding power supply according to claim 1, wherein the output control unit controls the welding voltage to be only a decreasing welding voltage during the arc period.

* * * * *